(12) United States Patent
Gill

(10) Patent No.: US 6,381,094 B1
(45) Date of Patent: Apr. 30, 2002

(54) SHIELD STRUCTURE WITH A HEAT SINK LAYER FOR DISSIPATING HEAT FROM A READ SENSOR

(76) Inventor: Hardayal Singh Gill, 10 Grove Dr., Portala Valley, CA (US) 94028

( * ) Notice: Subject to any disclaimer, the term of this patent is extended or adjusted under 35 U.S.C. 154(b) by 0 days.

(21) Appl. No.: 09/359,968

(22) Filed: Jul. 23, 1999

(51) Int. Cl.[7] ............................................. G11B 5/147
(52) U.S. Cl. ....................................................... 360/126
(58) Field of Search ................................ 360/313, 126, 360/125

(56) References Cited

U.S. PATENT DOCUMENTS

| | | |
|---|---|---|
| 4,783,711 A | 11/1988 | Kitada et al. |
| 4,918,554 A | 4/1990 | Bajorek et al. |
| 5,264,981 A | 11/1993 | Campbell et al. |
| 5,644,455 A | 7/1997 | Schultz |
| 5,668,688 A | 9/1997 | Dykes et al. |
| 5,751,526 A | 5/1998 | Schemmel |
| 5,838,521 A | 11/1998 | Ravipati |

FOREIGN PATENT DOCUMENTS

| | | |
|---|---|---|
| JP | 360154603 | 8/1985 |
| JP | 62-277613 | 12/1987 |
| JP | 406084144 | 3/1994 |
| JP | 407129930 | 5/1995 |
| JP | 408036717 | 2/1996 |

OTHER PUBLICATIONS

T. A. Schwarz, "Magnetic Head Assembly with Magnetoresistive Sensor", *IBM Technical Disclosure Bulletin*, vol. 23, No. 10, Mar. 1981, p. 4664.

Anonymous, Deposition Process to Produce Anisotropic Sendust Films through Multilayer Lamination, *Research Disclosure*, May 1992.

Nobuyuki Ishiwata et al., "Narrow Track MR Head Technology", *IEEE Transactions on Magnetics*, vol. 32, No. 1, Jan. 1996, pp. 38–42.

*Primary Examiner*—Allen T. Cao
(74) *Attorney, Agent, or Firm*—Terrance A. Meador, Esq.; Gray Cary Ware & Freidenrich

(57) ABSTRACT

One or two shield structures is provided for a read head wherein each shield structure has a heat sink layer for dissipating heat from the read sensor and a ferromagnetic layer for shielding signal fields from a rotating magnetic disk other than the signal field being detected by the read head. In a preferred embodiment the heat sink layer employs a gold (Au) film between first and second tantalum (Ta) films and the ferromagnetic layer employs an iron nitride (FeN) film and a nickel iron cobalt (NiFeCo) film. The ferromagnetic layer is located between the heat sink layer and the read sensor. Iron nitride (FeN) has a high magnetization so that it can be relatively thin and yet provide necessary shielding of the read sensor and the nickel iron cobalt (NiFeCo) film as a high uniaxial anisotropy ($H_K$) which ensures that the magnetic moment of the ferromagnetic layer returns to its original position parallel to the air bearing surface of the read head after being rotated by an external magnetic field. The thinness of the iron nitride (FeN) film locates the heat sink layer close to the read sensor for improved heat dissipation.

45 Claims, 8 Drawing Sheets

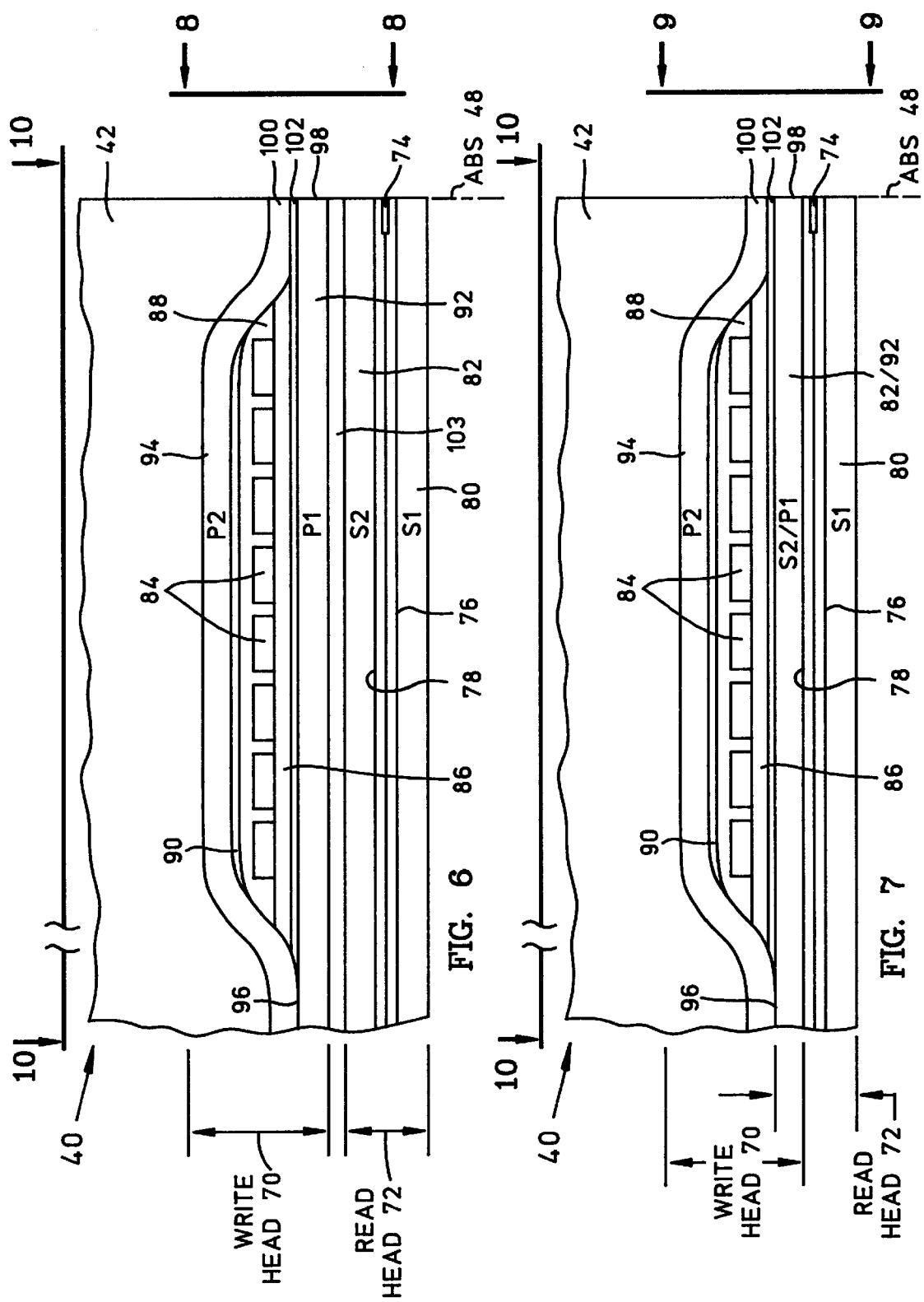

(ABS)

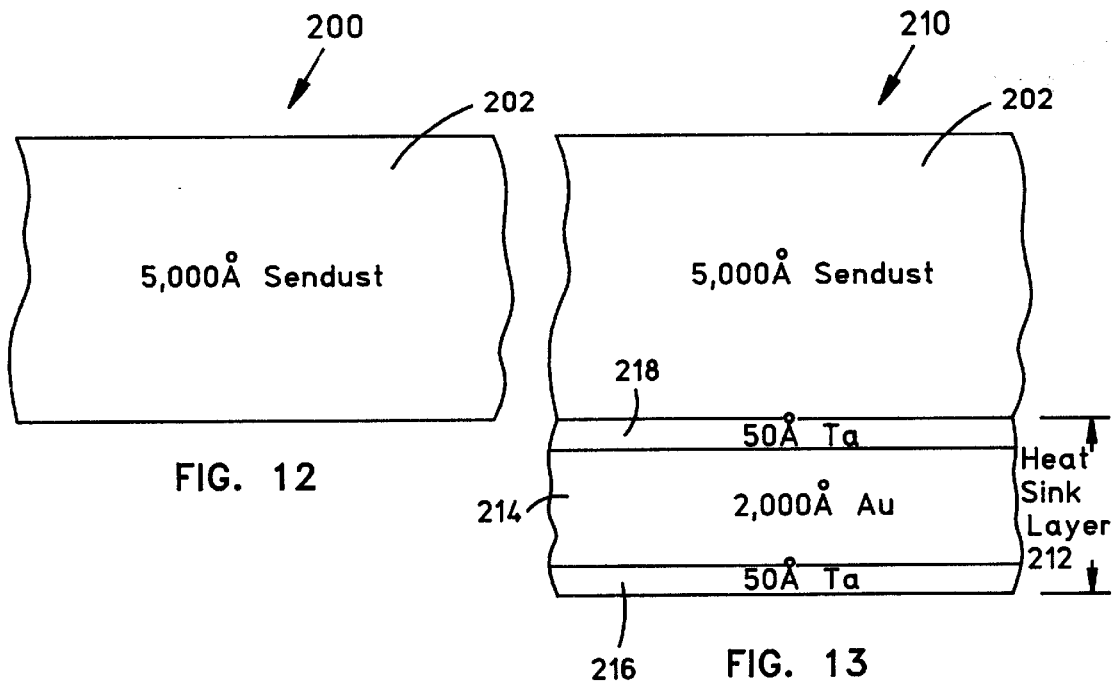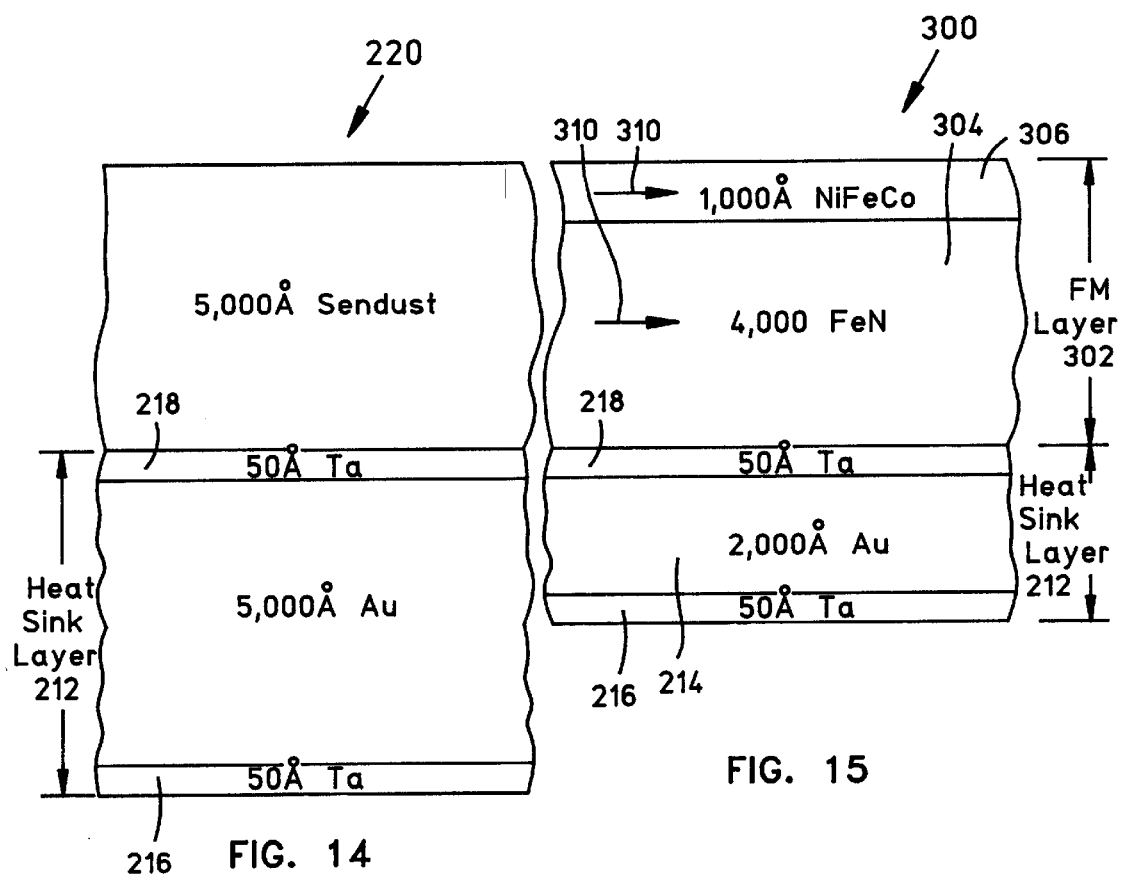

SHIELD STRUCTURE WITH A HEAT SINK LAYER FOR DISSIPATING HEAT FROM A READ SENSOR

BACKGROUND OF THE INVENTION

1. Field of the Invention

The present invention relates to a shield structure with a heat sink layer for dissipating heat from a read sensor and, more particularly, to a shield structure which has a heat sink layer and a ferromagnetic layer wherein the heat sink layer includes a gold film and the ferromagnetic layer includes iron nitride (FeN) and nickel iron cobalt (NiFeCo) films.

2. Description of the Related Art

The heart of a computer is an assembly that is referred to as a magnetic disk drive. The magnetic disk drive includes a rotating magnetic disk, write and read heads that are suspended by a suspension arm above the rotating disk and an actuator that swings the suspension arm to place the read and write heads over selected circular tracks on the rotating disk. The read and write heads are embedded in a slider and have an air bearing surface (ABS) that is exposed for facing the rotating disk. The suspension arm biases the slider into contact with the surface of the disk when the disk is not rotating but, when the disk rotates, air is swirled by the rotating disk adjacent the ABS causing the slider to ride on an air bearing a slight distance from the surface of the rotating disk so that the read and write heads are positioned for writing magnetic impressions to and reading magnetic impressions from the rotating disk. The read and write heads are connected to processing circuitry that operates according to a computer program to implement the writing and reading functions.

The write head includes a coil layer embedded in first, second and third insulation layers (insulation stack) which are, in turn, sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic field in the pole pieces which causes flux across the gap at the ABS for the purpose of writing the aforementioned magnetic impression in tracks on the aforementioned rotating disk.

The read head includes a read sensor which is located between nonmagnetic nonconductive first and second read gap layers. The first and second read gap layers are located between ferromagnetic first and second shield layers. First and second leads are connected to the sensor for conducting a sense current $I_S$ therethrough and are further connected by additional leads to the processing circuitry. The magnetization of the sensor changes in response to signal fields from tracks on the rotating disk which causes a change in the resistance of the sensor. These resistance changes cause corresponding potential changes in the processing circuitry which are processed as playback signals.

The sense current $I_S$ is a major contributor to the generation of heat within the magnetic head. Another heat source is the write coil in the write head. Excessive heat generated within the magnetic head can degrade the magnetics of the ferromagnetic layers in the read sensor as well as causing pole tip protrusion. Pole tip protrusion is caused by heat expansion of the insulation stack which, in turn, causes an alumina overcoat layer to protrude beyond the ABS and destroy the head. Accordingly, the sense current $I_S$ and the write coil current are maintained at appropriate levels so that heat will not degrade performance of the head. It is known, however, that an increase in the sense current $I_S$ results in an increased detection of the signal fields from the rotating disk. An increase in the detected signal equates to increased storage capacity of the magnetic disk drive.

The first and second shield layers of the read head are the best candidates for reducing heat generated by the sensor. It is desirable that the materials employed for the first and second shield layers have the best heat conductivity possible for promoting heat dissipation. Constraints on the selection of shield materials, however, are acceptable hardness, sufficient magnetization ($M_S$) to function as a shield and sufficient magnetic stability so that a magnetic moment of the shield layer fully returns to its easy axis orientation. Hardness is important because of a lapping process which laps the air bearing surface of the magnetic head. The ABS must be precisely lapped so that the sensor is established with a designed stripe height. Lapping is a grinding process which can smear soft materials across the ABS and cause shorting between the sensitive elements of the read sensor to the first and second shield layers. The shields are required to have high magnetization ($M_S$) so that the shields will readily conduct signal fields from bits (magnetic impressions) on the rotating disk adjacent to the bit being read by the read head. In order to promote magnetic stability it is required that the shield material have a high uniaxial anisotropy ($H_K$). The easy axis of the magnetic moment of each shield layer is parallel to the ABS and the surface planes of the shield layers. In a merged head, where the second shield layer also serves as a first pole piece layer, the write current rotates the magnetic moment of the second shield/first pole piece layer perpendicular to the ABS during the write function. If the magnetic moment does not return to the original parallel position to the ABS after relaxation of the write current the magnetic moment will magnetically influence the sensor in a different way which will alter the performance of the read head. Accordingly, it is important to consider the hardness of the materials and the magnetics of materials when selecting a material to improve the heat conductivity of the shield layers.

Typical materials employed for shield layers are Sendust (FeAlSi) and nickel iron (NiFe). Nickel iron (NiFe) is known to be a better heat sink than Sendust (FeAlSi), however, nickel iron (NiFe) has a tendency to smear across the ABS during the lapping operation. There is strong-felt need for providing shield layers which have heat conductivity, yet will provide the required hardness and magnetic properties mentioned hereinabove.

SUMMARY OF THE INVENTION

The present invention provides a shield stricture which includes a heat sink layer for dissipating heat and a ferromagnetic layer for satisfying the aforementioned magnetic properties of the shield layer. In a preferred embodiment, the heat sink layer includes a gold (Au) film. Gold (Au) is soft and will smear across the ABS unless properly supported. The gold (Au) film is sandwiched between first and second tantalum (Ta) films which are harder than gold and actually increase the hardness of the gold (Au) film itself. Gold (Au) has approximately four times the heat conductivity of nickel iron (NiFe). In a preferred embodiment the ferromagnetic layer includes an iron nitride (FeN) film and a nickel iron cobalt (NiFeCo) film. Iron nitride (FeN) is harder than Sendust (FeAlSi) or nickel iron (NiFe) which plays an important role in the invention which will be discussed hereinafter. Iron nitride (FeN) also has a high magnetization ($M_S$) which is approximately twice the magnetization ($M_S$) of nickel iron cobalt (NiFeCo). This is important so that the shield structure functions as a good magnetic shield for the sensor. On the other hand, nickel iron cobalt (NiFeCo) has a higher uniaxial anisotropy ($H_K$) than iron nitride (FeN). This ensures that the magnetic moment of the shield layer will return to its original easy axis position parallel to the ABS after being rotated by an external magnetic field. While a single nickel iron cobalt (NiFeCo) film can be employed for a shield structure this would require that the nickel iron cobalt (NiFeCo) film be twice as thick as an iron nitride (FeN) film since the magnetization ($M_S$) of the nickel iron cobalt (NiFeCo) film is one-half the magnetization ($M_s$) of an iron nitride (FeN) film. Accordingly, by employing the iron nitride (FeN) film between the heat sink layer and the nickel iron cobalt (NiFeCo) film the shield structure can be made thinner so that the heat sink layer is closer to the sensor for increased heat dissipation. An optional substitution for the nickel iron cobalt (NiFeCo) film is a nickel iron (NiFe) film and alloys thereof. While nickel iron (NiFe) and gold (Au) have a tendency to smear during lapping the tantalum (Ta) films promote the hardness of the gold (Au) film and the iron nitride (FeN) film in the ferromagnetic layer is harder than all of the films which provides support during the lapping process to reduce smearing of the softer films.

An object of the present invention is to provide a shield structure which has increased heat conductivity without sacrificing hardness and magnetic properties of the shield structure.

Another object is to provide one or more shield structures which enables an increase in the sense current $I_S$ without generating additional heat.

A further object is to provide a heat sink shield structure which provides high magnetization and high uniaxial anisotropy with a minimum thickness.

Other objects and advantages of the invention will become apparent upon reading the following description taken together with the accompanying drawings.

BRIEF DESCRIPTION OF THE DRAWINGS

FIG. 6 is a partial view of the slider and a piggyback magnetic head as seen in plane 6—6 of FIG. 2;

FIG. 7 is a partial view of the slider and a merged magnetic head as seen in plane 7—7 of FIG. 2;

FIG. 12 is an ABS illustration of a shield structure composed of Sendust;

FIG. 13 is the same as FIG. 12 except a heat sink layer composed of gold and tantalum underlies the Sendust film;

FIG. 14 is the same as FIG. 13 except the gold film is thicker;

FIG. 15 is an ABS illustration of the present invention wherein the shield structure includes a heat sink layer with gold and tantalum and a ferromagnetic layer with films of iron nitride (FeN) and nickel iron cobalt (NiFe Co);

DESCRIPTION OF THE PREFERRED EMBODIMENTS

Magnetic Disk Drive

Figure 1:
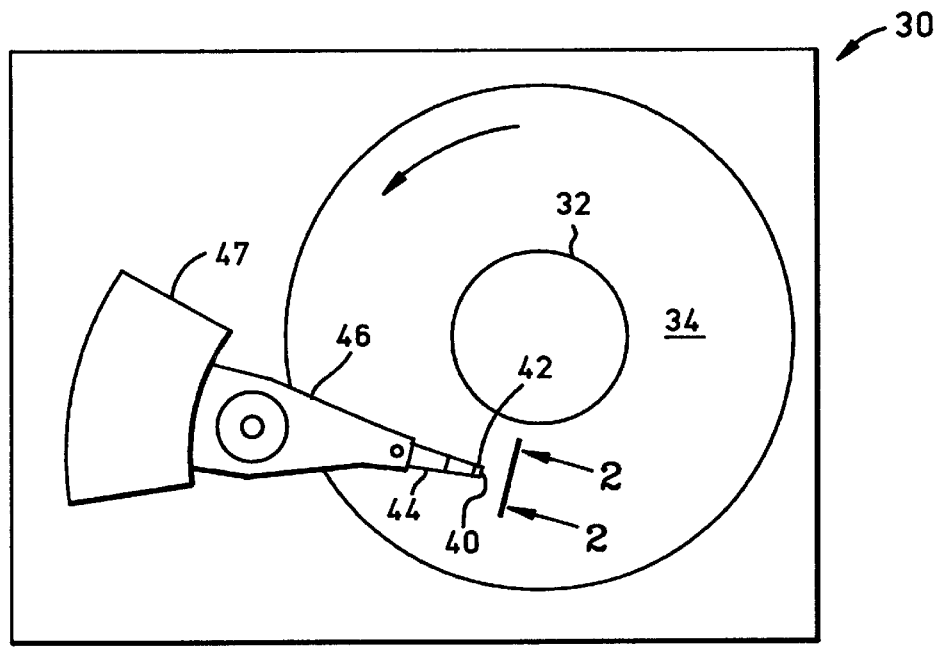
FIG. 1 is a plan view of an exemplary magnetic disk drive.
Figure 2:
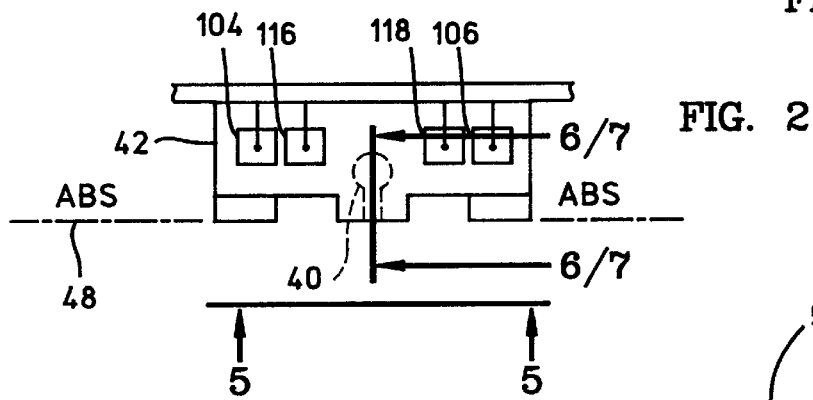
FIG. 2 is an end view of a slider with a magnetic head of the disk drive as seen in plane 2—2.
Figure 3:
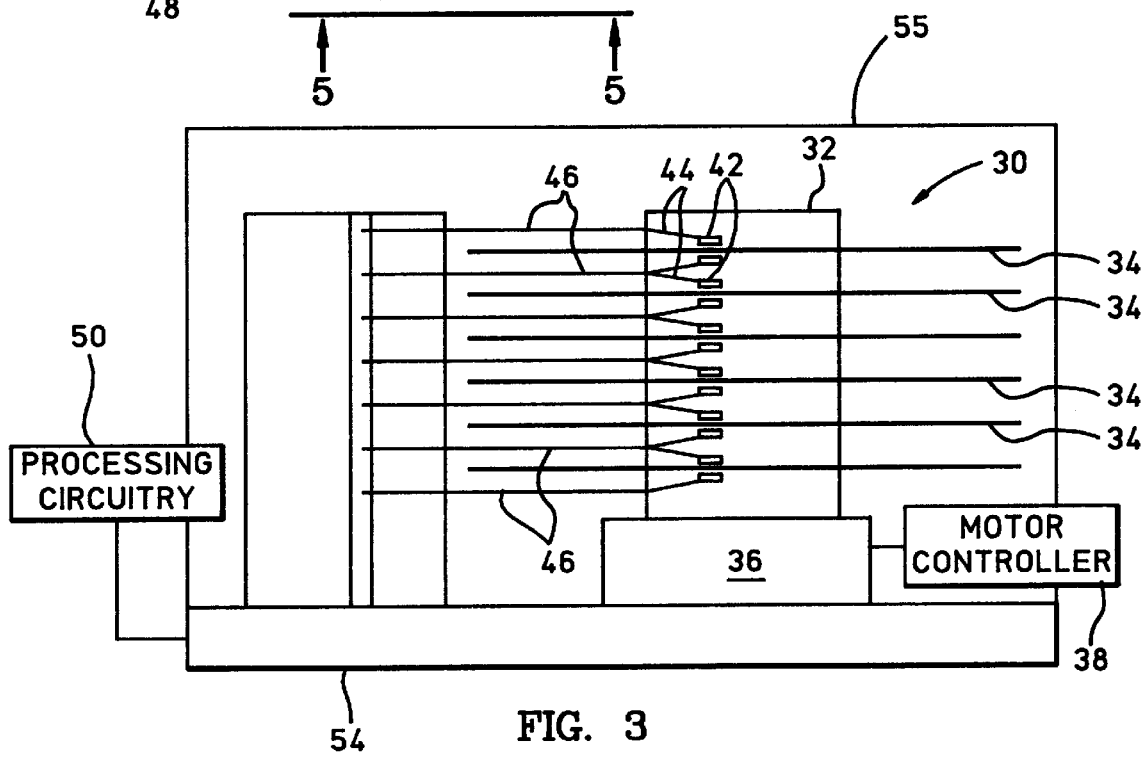
FIG. 3 is an elevation view of the magnetic disk drive wherein multiple disks and magnetic heads are employed.
Figure 4:
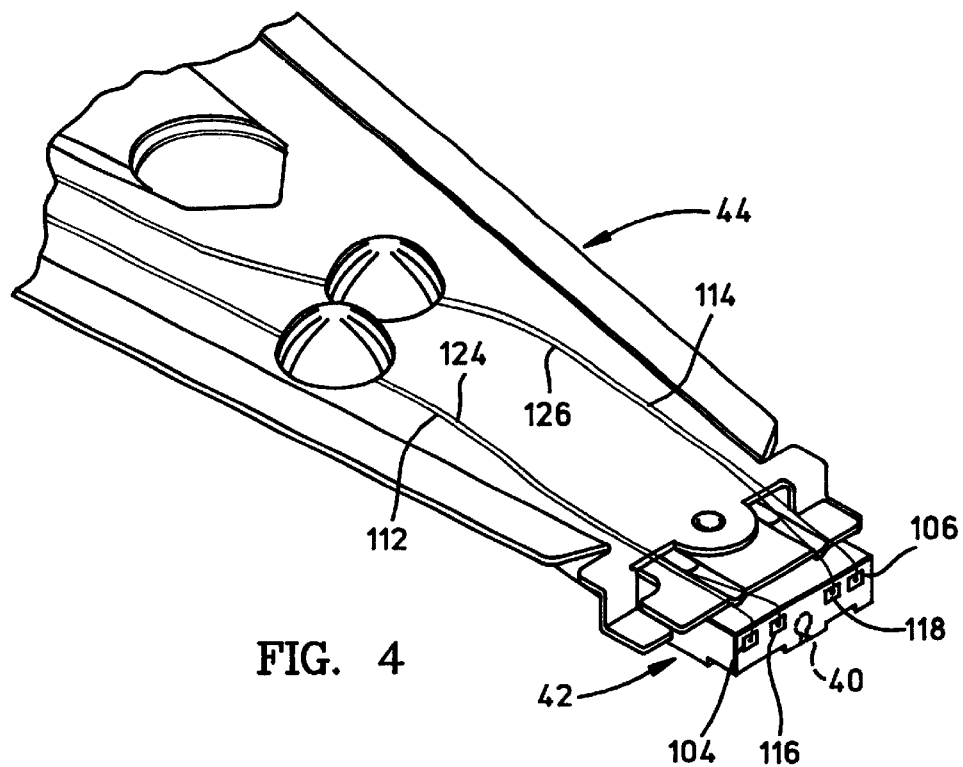
FIG. 4 is an isometric illustration of an exemplary suspension system for supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A combined read and write magnetic head 40 is mounted on a slider 42 that is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34. When the disk 34 is rotated by the spindle motor 36 the slider is supported on a thin (typically, 0.05 $\mu$m) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator 47 for moving the slider to various tracks. In FIG. 4 the slider 42 is shown mounted to a suspension 44. The components described hereinabove may be mounted on a frame 54 of a housing 55, as shown in FIG. 3.

Figure 5:
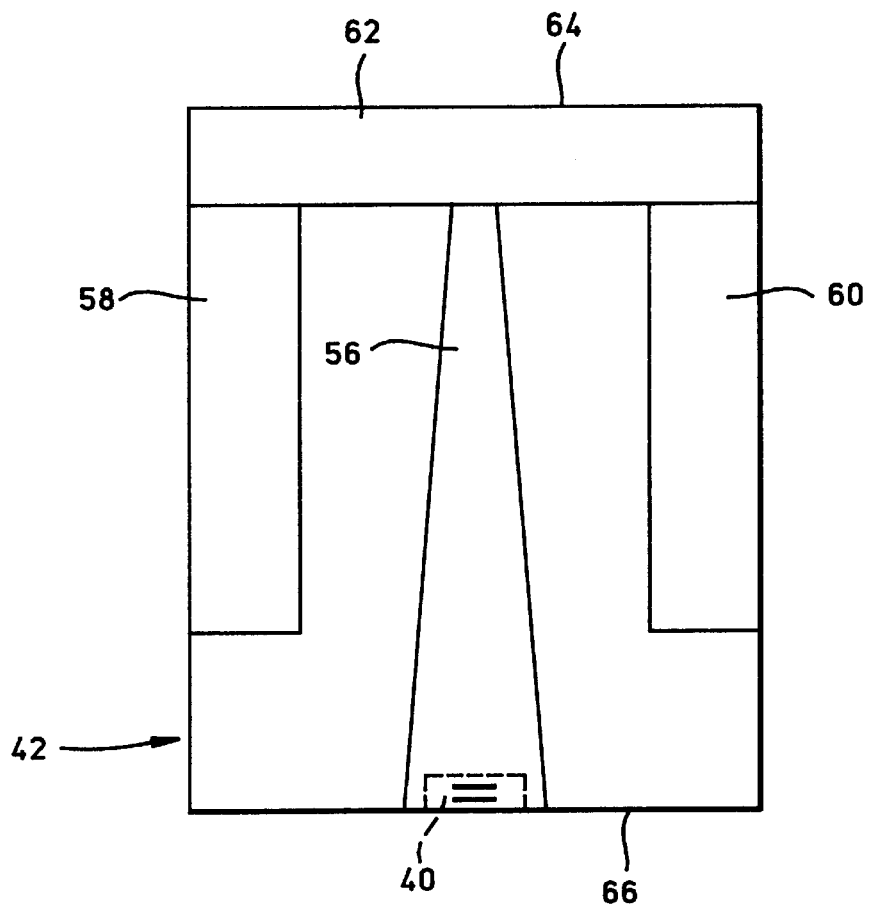
FIG. 5 is an ABS view of the slider taken along plane 5—5 of FIG. 2.

FIG. 5 is an ABS view of the slider 42 and the magnetic head 40. The slider has a center rail 56, which supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 8:
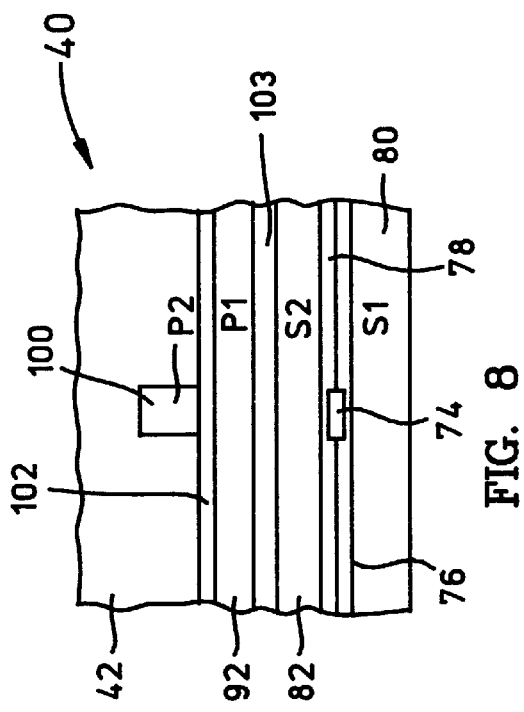
FIG. 8 is a partial ABS view of the slider taken along plane 8—8 of FIG. 6 to show the read and write elements of the piggyback magnetic head.

FIG. 6 is a side cross-sectional elevation view of a piggyback magnetic head 40, which includes a write head portion 70 and a read head portion 72, the read head portion employing a spin valve sensor 74 of the present invention. FIG. 8 is an ABS view of FIG. 6. The spin valve sensor 74 is sandwiched between nonmagnetic nonconductive first and second read gap layers 76 and 78, and the read gap layers are sandwiched between ferromagnetic first and second shield layers 80 and 82. In response to external magnetic fields, the resistance of the spin valve sensor 74 changes. A sense current $I_S$ conducted through the sensor causes these resistance changes to be manifested as potential changes. These potential changes are then processed as readback signals by the processing circuitry 50 shown in FIG. 3.

Figure 10:
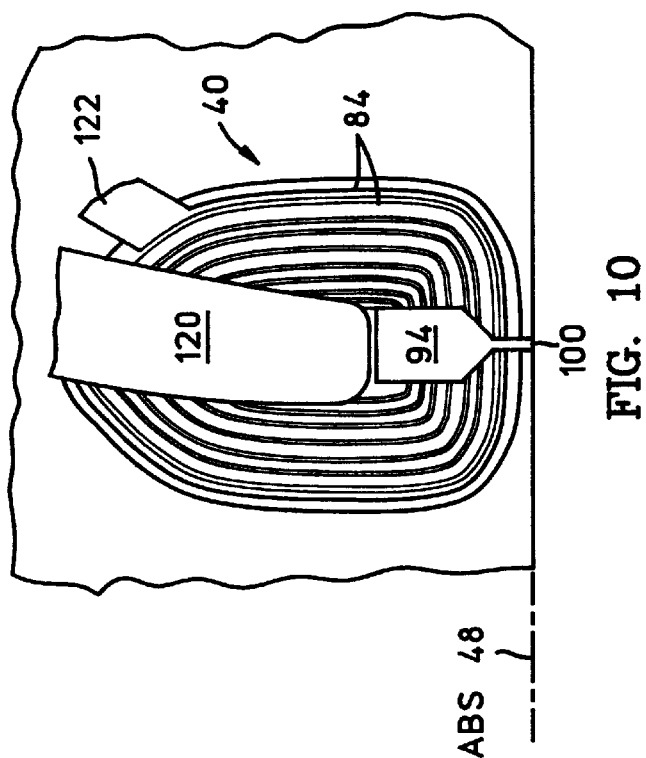
FIG. 10 is a view taken along plane 10—10 of FIGS. 6 or 7 with all material above the coil layer and leads removed.

The write head portion 70 of the magnetic head 40 includes a coil layer 84 sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. An insulation layer 103 is located between the second shield layer 82 and the first pole piece layer 92. Since the second shield layer 82 and the first pole piece layer 92 are separate layers this head is known as a piggyback head. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 10) to leads 124 and 126 on the suspension.

Figure 9:
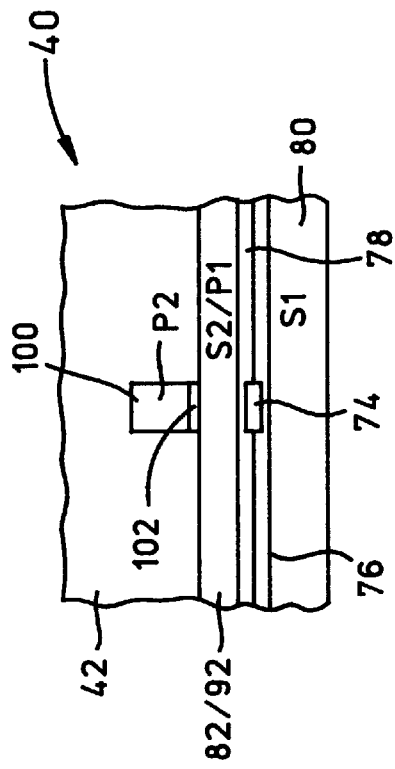
FIG. 9 is a partial ABS view of the slider taken along plane 9—9 of FIG. 7 to show the read and write elements of the merged magnetic head.

FIGS. 7 and 9 are the same as FIGS. 6 and 8 except the second shield layer 82 and the first pole piece layer 92 are a common layer. This type of head is known as a merged magnetic head. The insulation layer 103 of the piggyback head in FIGS. 6 and 8 is omitted.

Figure 11:
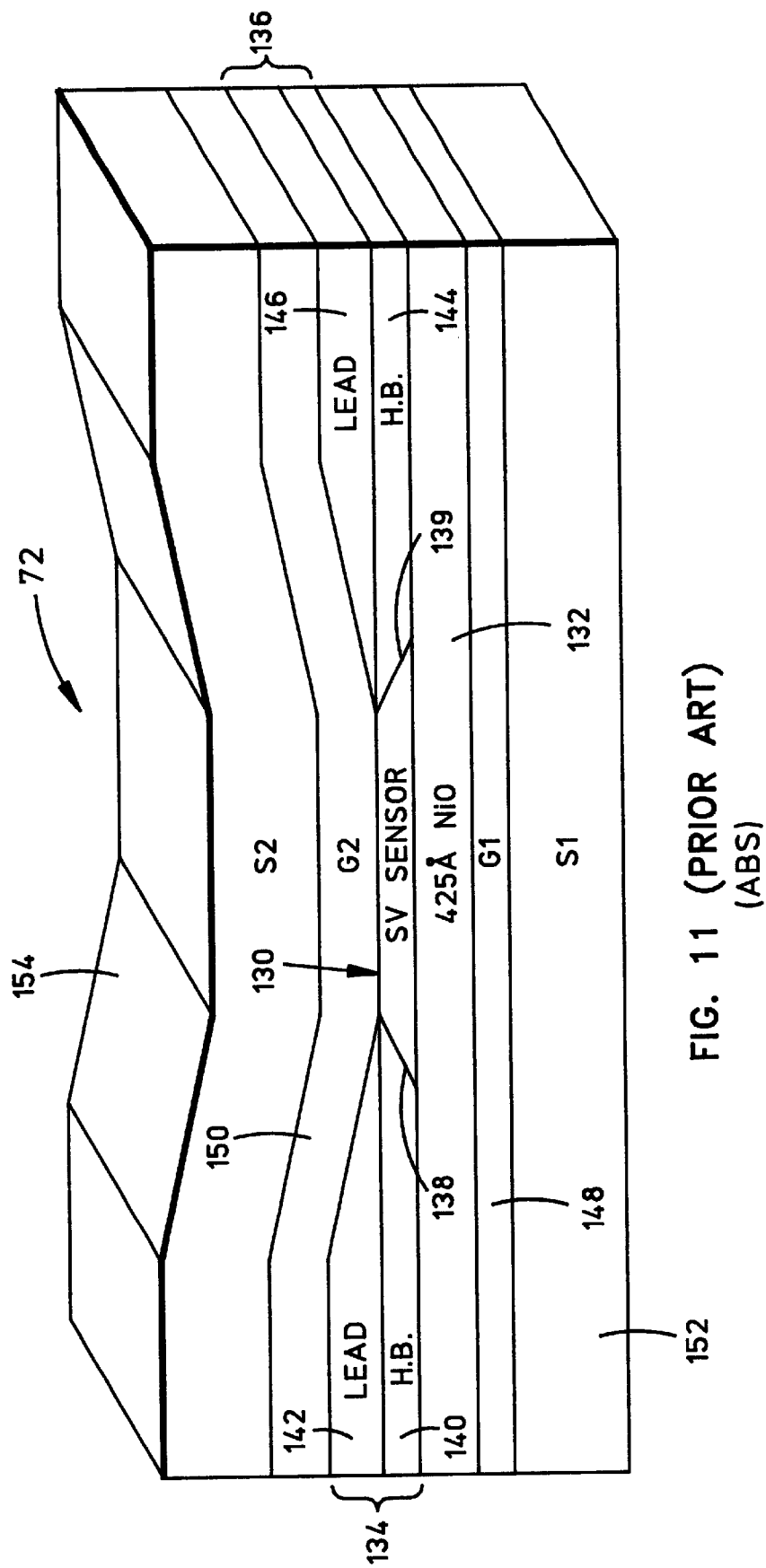
FIG. 11 is an isometric ABS illustration of a prior art read head which employs a spin valve sensor.

FIG. 11 is an isometric ABS illustration of a prior art read head 72 which has a spin valve sensor 130. An antiferromagnetic pinning layer 132, such as 425 Å of nickel oxide (NiO), may be employed for pinning a magnetic moment of a pinned layer of the spin valve sensor 130 perpendicular to the ABS. First and second hard bias and lead layers 134 and 136 are connected to first and second side edges 138 and 139 of the spin valve sensor. This connection is known in the art as a contiguous junction and is fully described in commonly assigned U. S. Pat. 5,018,037. The first hard bias and lead layers 134 include a first hard bias layer 140 and a first lead layer 142 and the second hard bias and lead layers 136 include a second hard bias layer 144 and a second lead layer 146. The hard bias layers 140 and 144 cause magnetic flux to extend longitudinally through the spin valve sensor 130 for stabilizing magnetic domains of the free layer. The spin valve sensor 130 and the first and second hard bias and lead layers 134 and 136 are located between nonmagnetic electrically insulative first and second read gap layers 148 and 150. The first and second read gap layers 148 and 150 are, in turn, located between first and second shield layers 152 and 154.

Various tests were conducted on the examples shown in FIGS. 12–15 to determine the sense current $I_S$ while maintaining the generation of heat constant. The example shown in FIG. 15 is a preferred embodiment of the present invention. FIG. 12 shows a shield structure which employs a 5000 Å thick Sendust (FeAlSi) film 202. This shield structure is typically employed for the first shield layer. FIG. 13 shows a shield structure 210 which is the same as the shield structure 200 except a heat sink layer 212 underlies the Sendust layer 202. The heat sink layer includes a 2000 Å gold (Au) film 214 sandwiched between 50 Å thick tantalum (Ta) first and second films 216 and 218. With the heat sink layer shown in FIG. 13 the shield structure was capable of conducting 5% more sense current $I_S$ than the sense current $I_S$ conducted by the shield structure 200 in FIG. 12. In FIG. 14 there is shown a shield structure 220 which is the same as the shield structure 210 shown in FIG. 13 except the gold (Au) layer is 5000 Å thick instead of 2000 Å thick. The sense current $I_S$ through the sensor was increased 7.5% over the FIG. 12 embodiment without generating additional heat.

The Invention

The present shield structure 300 is shown in FIG. 15 which includes the heat sink layer 212 and a ferromagnetic layer 302. The gold (Au) film 214 is 2000 Å thick and each of the first and second tantalum (Ta) films 216 and 218 is 50 Å thick. The ferromagnetic layer 302 includes a 4000 Å thick iron nitride (FeN) film 304 and a 1000 Å thick nickel iron cobalt (NiFeCo) film 306. As discussed hereinabove, the iron nitride (FeN) film 304 has high magnetization ($M_S$) and the nickel iron cobalt (NiFeCo) film 306 has a high uniaxial anisotropy ($H_K$). The iron nitride (FeN) film 304 provides a high degree of shielding for the sensor while the nickel iron cobalt (NiFeCo) film 306 provides magnetic stability by ensuring that a magnetic moment 310 of the ferromagnetic layer 302 returns to its original orientation parallel to the ABS.

Figure 16:
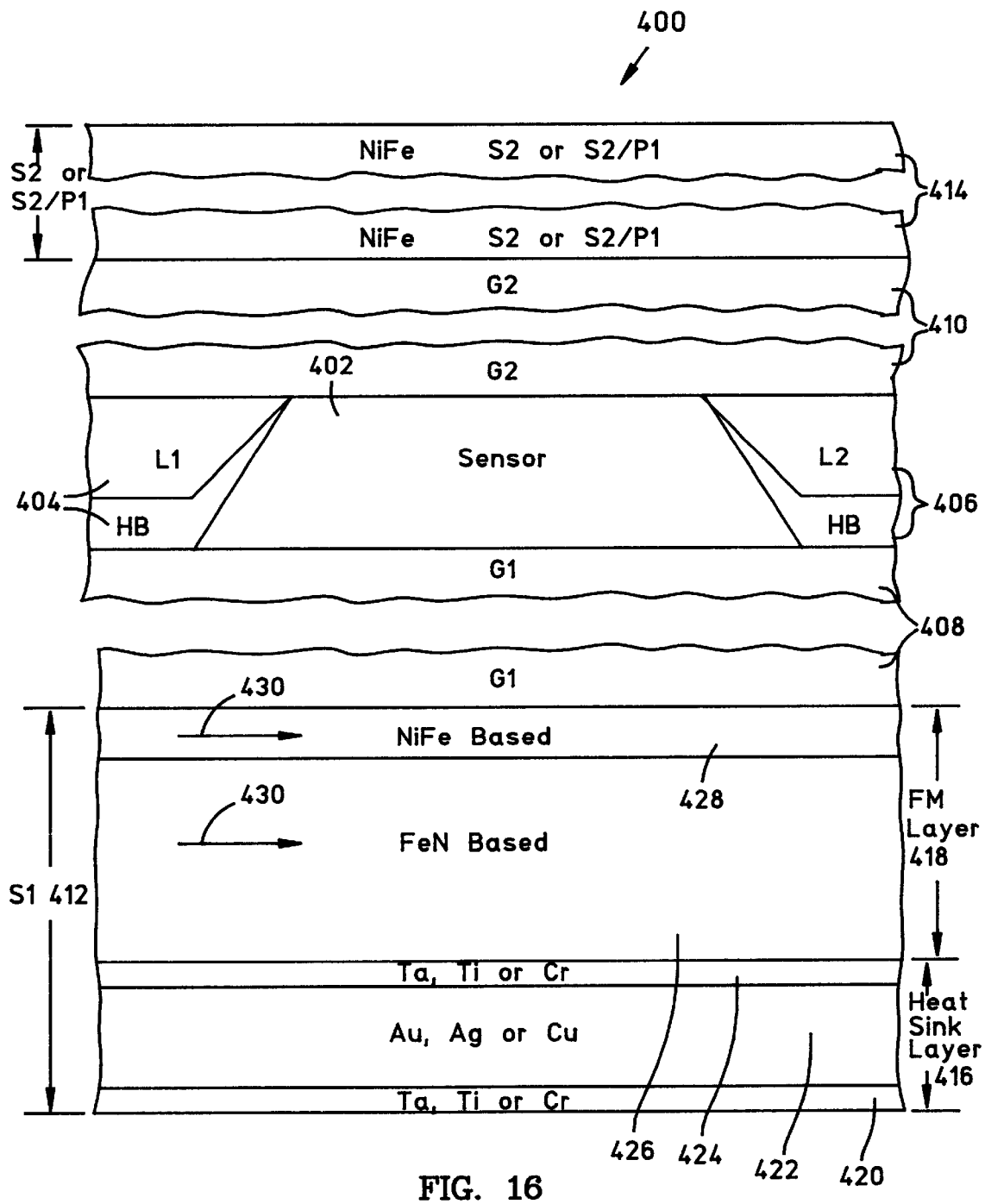
FIG. 16 is an ABS illustration of a read head employing a shield structure such as that shown in FIG. 15.

FIG. 16 shows an ABS illustration of an exemplary read head 400 which is employed in either a merged or piggyback type of head. The read head 400 has a read sensor 402 which is connected to first and second hard bias and lead layers 404 and 406. The read sensor 402 and the first and second hard bias and lead layers 404 and 406 are located between nonmagnetic nonconductive first and second read gap layers (G1 and G2) 408 and 410. The first and second read gap layers 408 and 410 are located between a first shield structure (S1) 412 and a second shield structure (S2) or second shield/first pole piece layer (S2/P1) 414. The second shield structure 414 may be a single layer of nickel iron (NiFe).

The first shield structure 412 includes a heat sink layer 416 and a ferromagnetic (FM) layer 418 with the ferromagnetic layer 418 being located between the heat sink layer 416 and the first read gap layer 408. The heat sink layer 416 includes first, second and third films 420, 422 and 424 with the second film 422 being located between the first and third films 420 and 424. The second film 422 is a highly heat conductive film which is thicker than either of the first and second films 420 and 424 and may be composed of gold (Au), silver (Ag) or copper (Cu) with the preferred material being gold (Au). The first and third films 420 and 424 may be composed of tantalum (Ta), titanium (Ti) or chromium (Cr) with the preferred material being tantalum (Ta). The first and third films 420 and 424 are harder than the second film 422. When the first and third films 420 and 424 are tantalum (Ta) and the second film is gold (Au) the first and third films increase the hardness of the gold (Au) second film 422. The thickness of the heat sink layer 416 is less than the thickness of the ferromagnetic layer 418.

The ferromagnetic layer 418 is composed of an iron nitride (FeN) based film 426, with a preferred material being iron nitride (FeN), and a nickel iron (NiFe) based film 428 which is preferably nickel iron cobalt (NiFeCo). The iron nitride (FeN) based film 426 is thicker than the nickel iron (NiFe) based film 428. The iron nitride (FeN) based film 426 has a higher magnetization (Ms) than the nickel iron (NiFe) based film 428 so that the iron nitride (FeN) based film 426 can be thinner for locating the heat sink layer 416 closer to the sensor 402 for increased heat dissipation. However, the nickel iron cobalt (NiFeCo) film 428 has a high uniaxial anisotropy which ensures that a magnetic moment 430 of the ferromagnetic layer 418 is returned to its initial easy axis orientation parallel to the ABS after being rotated therefrom by an external magnetic field. This is important for assuring a constant magnetic influence on the sensor 402. The magnetic moment 430 can be either directed from left to right or from right to left.

Figure 17:
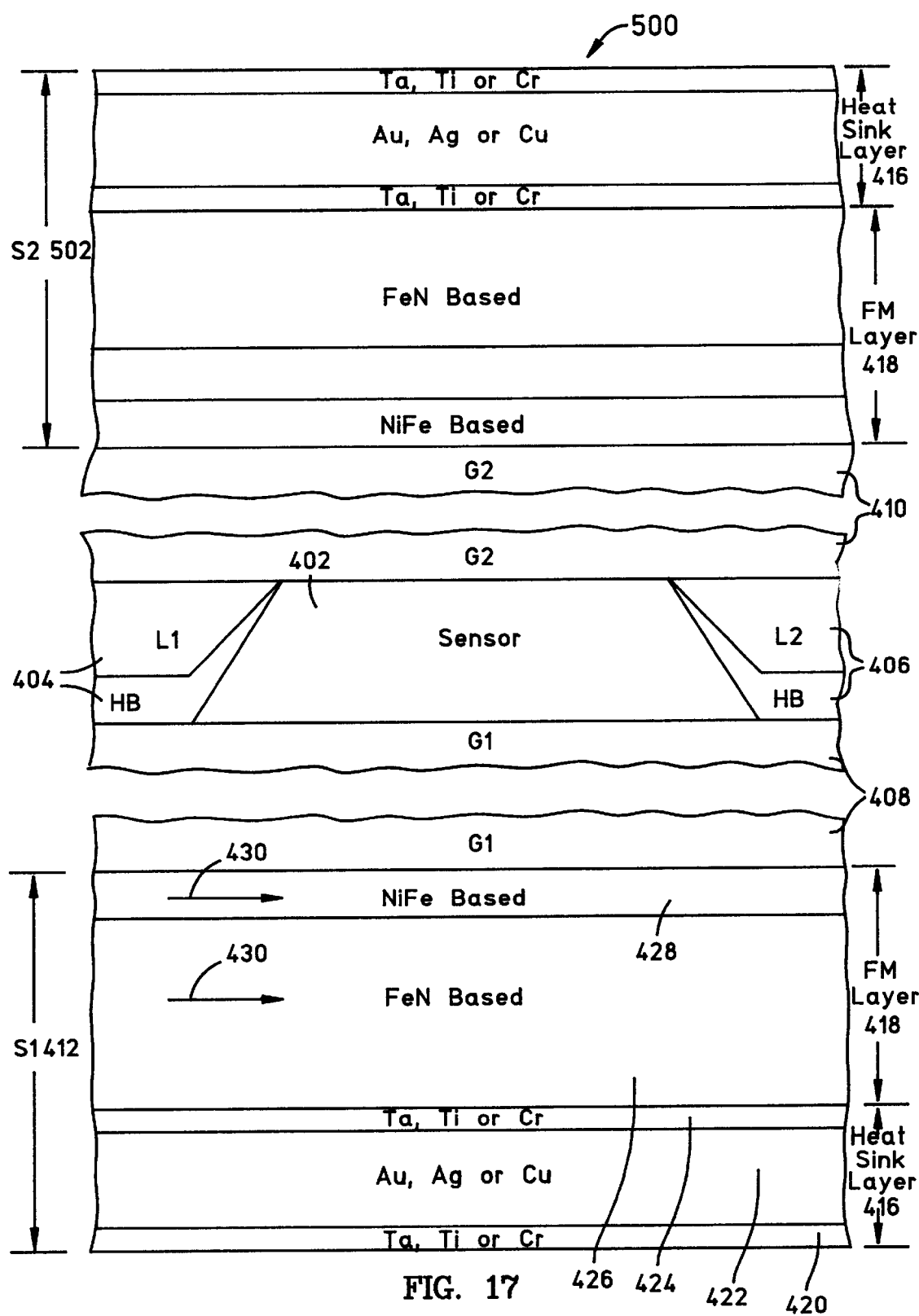
FIG. 17 is a read head wherein each of the first and second shield structures employs a shield structure such as that shown in FIG. 15.

The read head 500 shown in FIG. 17 is the same as the read head 400 shown in FIG. 16 except a second shield structure 502 also includes a heat sink layer 416 and a ferromagnetic layer 418 in the same manner as the first shield structure 412. This type of read head is typically employed in a piggyback type head since the write head has a separate layer that functions as a first pole piece layer. The head 500 will dissipate more heat than the head 400 since each of the shield structures employs a heat sink layer.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and the accompanying drawings.

I claim:

1. A magnetic read head comprising:
    a read sensor;
    nonmagnetic nonconductive first and second read gap layers;
    the read sensor being located between the first and second read gap layers;
    first and second shield structures;
    the first and second read gap layers being located between the first and second shield structures;
    at least one of the shield structures including a heat sink layer and a ferromagnetic layer wherein the ferromagnetic layer is located between the heat sink layer and the read sensor;
    the heat sink layer including:
        at least first, second and third films with the second film being located between the first and third films; and
        the first and third films being selected from the group comprising tantalum (Ta), titanium (Ti) and chromium (Cr) and the second film being selected from the group gold (Au), silver (Ag) and copper (Cu); and
    the ferromagnetic layer including:
        at least an iron nitride (FeN) based film and a nickel iron (NiFe) based film with the nickel iron (NiFe) based film being located between the iron nitride (FeN) based film and the read sensor.

2. A magnetic read head as claimed in claim 1 wherein the iron nitride (FeN) based film is an iron nitride (FeN) film and the nickel iron cobalt (NiFeCo) based film is an nickel iron cobalt (NiFeCo) film.

3. A magnetic read head as claimed in claim 2 wherein the first and third films are tantalum (Ta) and the second film is gold (Au).

4. A magnetic read head as claimed in claim 1 wherein said at least one of the shield structures is said first shield structure.

5. A magnetic read head as claimed in claim 4 wherein the iron nitride (FeN) based film is an iron nitride (FeN) film and the nickel iron cobalt (NiFeCo) based film is an nickel iron cobalt (NiFeCo) film.

6. A magnetic read head as claimed in claim 5 wherein the first and third films are tantalum (Ta) and the second film is gold (Au).

7. A magnetic read head as claimed in claim 6 wherein the iron nitride (FeN) film has a thickness that is greater than a thickness of the nickel iron cobalt (NiFeCo) film.

8. A magnetic read head as claimed in claim 7 wherein a thickness of the ferromagnetic layer is greater than a thickness of the heat sink layer.

9. A magnetic read head as claimed in claim 1 wherein each of the first and second shield structures includes a respective said beat sink layer and a respective said ferromagnetic layer.

10. A magnetic read head as claimed in claim 9 wherein the iron nitride (FeN) based film is an iron nitride (FeN) film and the nickel iron cobalt (NiFeCo) based film is an nickel iron cobalt (NiFeCo) film.

11. A magnetic read head as claimed in claim 10 wherein the first and third films are tantalum (Ta) and the second film is gold (Au).

12. A magnetic read head as claimed in claim 11 wherein the iron nitride (FeN) film has a thickness that is greater than a thickness of the nickel iron cobalt (NiFeCo) film.

13. A magnetic read head as claimed in claim 12 wherein a thickness of the ferromagnetic layer is greater than a thickness of the heat sink layer.

14. A magnetic head assembly including a read head and a write head and an air bearing surface (ABS) comprising:
    the write head including:
        ferromagnetic first and second pole piece layers;
        each of the first and second pole piece layers having a yoke portion located between a pole tip portion and a back gap portion;
        a nonmagnetic write gap layer located between the pole tip portions of the first and second pole piece layers;
        an insulation stack with at least one coil layer embedded therein located between the yoke portions of the first and second pole piece layers; and
        the first and second pole piece layers being connected at their back gap portions; and
    the read head including:
        a read sensor;
        first and second lead layer and hard bias layer structures connected to the read sensor;
        nonmagnetic nonconductive first and second read gap layers;
        the read sensor and the first and second lead layer and hard bias layer structures being located between the first and second read gap layers;
        a first shield structure;
        the first and second read gap layers being located between the first shield structure and the first pole piece layer;
        the first shield structure including a heat sink layer and a ferromagnetic layer wherein the ferromagnetic shield layer is located between the heat sink layer and the read sensor;
    the heat sink layer including:
        at least first, second and third films with the second film being located between the first and third films; and
        the first and third films being selected from the group comprising tantalum (Ta), titanium (Ti) and chromium (Cr) and the second film being selected from the group gold (Au), silver (Ag) and copper (Cu); and
    the ferromagnetic layer including:
        at least an iron nitride (FeN) based film and a nickel iron (NiFe) based film with the nickel iron (NiFe) film being located between the iron nitride (FeN) film and the read sensor.

15. A magnetic head assembly as claimed in claim 14 including:
the read head further including:
a second shield structure located between the second read gap layer and the first pole piece layer; and
a nonmagnetic nonconductive separation layer located between the second shield layer the first pole piece layer.

16. A magnetic head assembly as claimed in claim 14 wherein the iron nitride (FeN) based film is an iron nitride (FeN) film and the nickel iron cobalt (NiFeCo) based film is an nickel iron cobalt (NiFeCo) film.

17. A magnetic head assembly as claimed in claim 16 wherein the first and third films are tantalum (Ta) and the second film is gold (Au).

18. A magnetic head assembly as claimed in claim 17 including:
the read head further including:
a second shield structure located between the second read gap layer and the first pole piece layer; and
a nonmagnetic nonconductive separation layer located between the second shield layer the first pole piece layer.

19. A magnetic head assembly as claimed in claim 18 wherein each of the first and second shield structures includes a respective said heat sink layer and a respective said ferromagnetic layer.

20. A magnetic head assembly as claimed in claim 19 wherein the iron nitride (FeN) film has a thickness that is greater than a thickness of the nickel iron cobalt (NiFeCo) film.

21. A magnetic head assembly as claimed in claim 20 wherein a thickness of the ferromagnetic layer is greater than a thickness of the heat sink layer.

22. A magnetic disk drive having at least one slider that has an air bearing surface (ABS), the slider supporting at least one magnetic head assembly that includes a read head and a write head, the disk drive comprising:
the write head including:
first and second pole piece layers;
each of the first and second pole piece layers having a yoke portion located between a pole tip portion and a back gap portion;
a nonmagnetic write gap layer located between the pole tip portions of the first and second pole piece layers;
an insulation stack with at least one coil layer embedded therein located between the yoke portions of the first and second pole piece layers; and
the first and second pole piece layers being connected at their back gap portions; and
the read head including:
a read sensor;
first and second lead layer and hard bias layer structures connected to the read sensor;
nonmagnetic nonconductive first and second read gap layers;
the read sensor and the first and second lead layer and hard bias layer structures being located between the first and second read gap layers;
a first shield structure;
the first and second read gap layers being located between the first shield structure and the first pole piece layer;
the first shield structure including a heat sink layer and a ferromagnetic layer wherein the ferromagnetic layer is located between the heat sink layer and the read sensor;
the heat sink layer including:
at least first, second and third films with the second film being located between the first and third films; and
the first and third films being selected from the group comprising tantalum (Ta), titanium (Ti) and chromium (Cr) and the second film being selected from the group gold (Au), silver (Ag) and copper (Cu); and
the ferromagnetic layer including:
at least an iron nitride (FeN) based film and a nickel iron (NiFe) based film with the nickel iron (NiFe) film being located between the iron nitride (FeN) film and the read sensor; and
a housing;
a magnetic disk rotatably supported in the housing;
a support mounted in the housing for supporting the magnetic head assembly with its ABS facing the magnetic disk so that the magnetic head assembly is in a transducing relationship with the magnetic disk;
a spindle motor for rotating the magnetic disk;
an actuator connected to the support for moving the magnetic head assembly to multiple positions with respect to said magnetic disk; and
a processor connected to the magnetic head assembly, to the spindle motor and to the actuator for exchanging signals with the magnetic head assembly, for controlling movement of the magnetic disk and for controlling the position of the magnetic head assembly.

23. A magnetic disk drive as claimed in claim 22 wherein the iron nitride (FeN) based film is an iron nitride (FeN) film and the nickel iron cobalt (NiFeCo) based film is an nickel iron cobalt (NiFeCo) film.

24. A magnetic disk drive as claimed in claim 23 wherein the first and third films are tantalum (Ta) and the second film is gold (Au).

25. A magnetic disk drive as claimed in claim 24 including:
the read head further including:
a second shield structure located between the second read gap layer and the first pole piece layer; and
a nonmagnetic nonconductive separation layer located between the second shield layer the first pole piece layer.

26. A magnetic disk drive as claimed in claim 25 wherein each of the first and second shield structures includes a respective said heat sink layer and a respective said ferromagnetic layer.

27. A magnetic disk drive as claimed in claim 26 wherein the iron nitride (FeN) film has a thickness that is greater than a thickness of the nickel iron cobalt (NiFeCo) film.

28. A magnetic disk drive as claimed in claim 27 wherein a thickness of the ferromagnetic layer is greater than a thickness of the heat sink layer.

29. A method of making a magnetic read head comprising the steps of:
forming nonmagnetic nonconductive first and second read gap layers;
forming a read sensor between the first and second read gap layers;
forming a first shield structure;
forming the first and second read gap layers between the first shield structure and the first pole piece layer;
forming the first shield structure with a heat sink layer and a ferromagnetic layer wherein the ferromagnetic layer is located between the heat sink layer and the read sensor;

a making of the heat sink layer including the steps of:
  forming at least first, second and third films with the second film being located between the first and third films; and
  the first and third films being formed from a material selected from the group comprising tantalum (Ta), titanium (Ti) and chromium (Cr) and the second film being formed from a material selected from the group gold (Au), silver (Ag) and copper (Cu); and
a making of the ferromagnetic layer including:
  forming at least an iron nitride (FeN) based film and a nickel iron (NiFe) based film with the nickel iron (NiFe) film being located between the iron nitride (FeN) film and the read sensor.

30. A method as claimed in claim 29 wherein the iron nitride (FeN) based film is formed of iron nitride (FeN) and the nickel iron cobalt (NiFeCo) based film is formed of nickel iron cobalt (NiFeCo).

31. A method as claimed in claim 30 wherein the first and third films are formed of tantalum (Ta) and the second film is formed of gold (Au).

32. A method as claimed in claim 29 wherein each of the first and second shield structures is formed with a respective said heat sink layer and a respective said ferromagnetic shield layer.

33. A method as claimed in claim 32 wherein the iron nitride (FeN) based film is formed of iron nitride (FeN) and the nickel iron cobalt (NiFeCo) based film is formed of nickel iron cobalt (NiFeCo).

34. A method as claimed in claim 33 wherein the first and third films are formed of tantalum (Ta) and the second film is formed of gold (Au).

35. A method as claimed in claim 34 wherein the iron nitride (FeN) film is formed thicker than the nickel iron cobalt (NiFeCo) film.

36. A method as claimed in claim 35 wherein the ferromagnetic layer is formed thicker than the heat sink layer.

37. A method of making a magnetic head assembly including a read head and a write head and an air bearing surface (ABS) comprising the steps of:
  a making of the write head including the steps of:
    forming ferromagnetic first and second pole piece layers with a yoke portion located between a pole tip portion and a back gap portion;
    forming a nonmagnetic write gap layer between the pole tip portions of the first and second pole piece layers;
    forming an insulation stack with at least one coil layer embedded therein between the yoke portions of the first and second pole piece layers; and
    connecting the back gap portions of the first and second pole piece layers; and
  a making of the read head including the steps of:
    forming nonmagnetic nonconductive first and second read gap layers;
    forming a read sensor between the first and second read gap layers;
    forming a first shield structure;
    forming the first and second read gap layers between the first shield layer and the first pole piece layer;
    forming the first shield structure with a heat sink layer and a ferromagnetic layer wherein the ferromagnetic layer is located between the heat sink layer and the read sensor;
  a making of the heat sink layer including the steps of:
    forming at least first, second and third films with the second film being located between the first and third films; and
    the first and third films being formed from a material selected from the group comprising tantalum (Ta), titanium (Ti) and chromium (Cr) and the second film being formed from a material selected from the group gold (Au), silver (Ag) and copper (Cu); and
  a making of the ferromagnetic layer including:
    forming at least an iron nitride (FeN) based film and a nickel iron (NiFe) based film with the nickel iron (NiFe) film being located between the iron nitride (FeN) film and the read sensor.

38. A method as claimed in claim 37 wherein the iron nitride (FeN) based film is formed of iron nitride (FeN) and the nickel iron cobalt (NiFeCo) based film is formed of nickel iron cobalt (NiFeCo).

39. A method as claimed in claim 38 wherein the first and third films are formed of tantalum (Ta) and the second film is formed of gold (Au).

40. A method of making magnetic head assembly as claimed in claim 37
  wherein the making of the read head further includes the steps of:
    forming a second shield structure between the second read gap layer and the first pole piece layer; and
    forming a nonmagnetic nonconductive separation layer between the second shield structure and the first pole piece layer.

41. A method as claimed in claim 40 wherein each of the first and second shield structures is formed with a respective said heat sink layer and a respective said ferromagnetic shield layer.

42. A method as claimed in claim 41 wherein the iron nitride (FeN) based film is formed of iron nitride (FeN) and the nickel iron cobalt (NiFeCo) based film is formed of nickel iron cobalt (NiFeCo).

43. A method as claimed in claim 42 wherein the first and third films are formed of tantalum (Ta) and the second film formed of gold (Au).

44. A method as claimed in claim 43 wherein the iron nitride (FeN) film is formed thicker than the nickel iron cobalt (NiFeCo) film.

45. A method as claimed in claim 44 wherein the ferromagnetic layer is formed thicker than the heat sink layer.

* * * * *